US012664724B2

(12) United States Patent
Adachi

(10) Patent No.: US 12,664,724 B2
(45) Date of Patent: Jun. 23, 2026

(54) INFORMATION PROCESSING APPARATUS, INFORMATION PROCESSING METHOD, AND STORAGE MEDIUM FOR ASSOCIATING DEFECT REGIONS OF A 3D MODEL WITH SILHOUETTE IMAGES

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 18/399,833

(22) Filed: Dec. 29, 2023

(65) Prior Publication Data

US 2024/0233259 A1 Jul. 11, 2024

(30) Foreign Application Priority Data

Jan. 10, 2023 (JP) ................................. 2023-001900

(51) Int. Cl.
*G06T 17/00* (2006.01)
*G06T 7/00* (2017.01)
*G06T 19/20* (2011.01)

(52) U.S. Cl.
CPC ............ *G06T 17/00* (2013.01); *G06T 7/0002* (2013.01); *G06T 19/20* (2013.01); *G06T 2200/24* (2013.01); *G06T 2207/20084* (2013.01); *G06T 2219/2021* (2013.01)

(58) Field of Classification Search
None
See application file for complete search history.

(56) References Cited

U.S. PATENT DOCUMENTS 10,510,159 B2 12/2019 Adachi
2006/0140473 A1* 6/2006 Brooksby ............ G01N 21/952
                                                    382/285
2006/0257015 A1* 11/2006 Katahata ................. G06T 7/001
                                                    382/145
2014/0225908 A1* 8/2014 Marshall ................. G06T 19/00
                                                    345/545

(Continued)

FOREIGN PATENT DOCUMENTS

JP       2007-271408 A       10/2007
JP       2019-106617 A       6/2019

OTHER PUBLICATIONS

Starck, Hilton. Model-based multiple view reconstruction of people. InProceedings Ninth IEEE International Conference on Computer Vision Oct. 13, 2003 (pp. 915-922). IEEE. (Year: 2003).*

(Continued)

*Primary Examiner* — Zhengxi Liu

(74) *Attorney, Agent, or Firm* — Carter, DeLuca & Farrell LLP

(57) ABSTRACT

To make it possible to easily identify a silhouette image causing a hole or chip having occurred in a 3D model and an imaging device corresponding to the silhouette image. Defect region information identifying a defect region of a 3D model representing a three-dimensional shape of an object, which is generated based on a plurality of silhouette images, is set. Then, the defect region identified by the set defect region information is associated with the plurality of silhouette images and results of the association are displayed.

18 Claims, 7 Drawing Sheets

(56) References Cited

U.S. PATENT DOCUMENTS

| | | | | |
|---|---|---|---|---|
| 2015/0269785 A1* | 9/2015 | Bell | ........................ | G06T 13/80 345/427 |
| 2018/0033194 A1* | 2/2018 | Goel | ................... | G06V 20/653 |
| 2019/0108396 A1* | 4/2019 | Dal Mutto | ............ | G06V 20/52 |
| 2020/0205943 A1* | 7/2020 | Elbaz | ................. | A61B 1/00194 |
| 2022/0086413 A1 | 3/2022 | Adachi | | |
| 2023/0245378 A1 | 8/2023 | Adachi | | |
| 2023/0394751 A1* | 12/2023 | Jayatunga | .............. | G06T 7/579 |
| 2024/0119856 A1* | 4/2024 | Kwon | ................... | G09B 25/02 |

OTHER PUBLICATIONS

Wen C, Zhang Y, Li Z, Fu Y. Pixel2mesh++: Multi-view 3d mesh generation via deformation. InProceedings of the IEEE/CVF international conference on computer vision 2019 (pp. 1042-1051). (Year: 2019).*

Fei, Xiaoya, et al. "Hole-filling for 3D Reconstructed Models from Multi-view Stereo." 2018 IEEE International Conference on Information and Automation (ICIA). IEEE, 2018. (Year: 2018).*

Liang, Chen, and Kwan-Yee K. Wong. "3D reconstruction using silhouettes from unordered viewpoints." Image and Vision Computing 28.4 (2010): 579-589. (Year: 2010).*

* cited by examiner camera id : 50

INFORMATION PROCESSING APPARATUS, INFORMATION PROCESSING METHOD, AND STORAGE MEDIUM FOR ASSOCIATING DEFECT REGIONS OF A 3D MODEL WITH SILHOUETTE IMAGES

BACKGROUND

Field

The present disclosure relates to a technique to generate three-dimensional shape data of an object.

Description of the Related Art

These days, a volumetric technique is attracting attention, which generates a virtual viewpoint image by installing a plurality of imaging devices at different positions to perform synchronous image capturing and using a plurality of images based on the image capturing. Japanese Patent Laid-Open No. 2007-271408 has disclosed a method of generating three-dimensional shape data of an object across a plurality of frames by extracting a portion in which the object is captured as a foreground area from each of a plurality of images to generate a silhouette image and based on the obtained plurality of silhouette images. The three-dimensional shape data is generally called "3D model".

In the actual synchronous image capturing, it may happen that the exposure setting is erroneous for only part of the imaging devices, the color of the background, such as spectators and advertisements, is similar to the color of the object, part of the object is hidden by obstacles, such as cheering flags, from the viewpoints of part of the imaging devices, and so on. In a case where such as those described above happen, it is not possible to extract the original foreground area successfully from each captured image, and therefore, the object shape (silhouette) in the silhouette image is imperfect. In this case, also in a 3D model that is generated based on a plurality of silhouette images corresponding to each imaging device, a defect, such as a hole and a chip, occurs. Consequently, it becomes necessary to take measures to identify the imperfect silhouette image and the imaging device corresponding thereto to modify the hole or chip on the silhouette image, or not to use the silhouette image corresponding to the imaging device for the generation of a 3D model. As regards the problem such as this, Japanese Patent Laid-Open No. 2019-106617 has disclosed a method of displaying only the images relating to the object from among all the images captured by a plurality of imaging devices. However, even with the technique of Japanese Patent Laid-Open No. 2019-106617, in a case where the number of images relating to the object is large, it is still difficult to identify the causes of a hole or chip in the 3D model from the images.

SUMMARY

The information processing apparatus according to the present disclosure is an information processing apparatus including: one or more memories storing instructions; and one or more processors executing the instructions to perform: obtaining a plurality of silhouette images representing a silhouette of an object, which corresponds to each of a plurality of captured images obtained by a plurality of imaging devices; generating a 3D model representing a three-dimensional shape of the object based on the plurality of silhouette images; setting defect region information identifying a defect region of the generated 3D model; associating a defect region identified by the set defect region information with the plurality of silhouette images; and causing a display unit to display results of the association.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, an example is described in which a silhouette image causing a defect region is detected and displayed in a system generating three-dimensional shape data (in the following, described as "3D model") of an object based on images captured by a plurality of imaging devices. Further, in the present embodiment, explanation is given y taking a person object as an example, but it is needless to say that, for example, in a case of a sports game, things, such as a ball and equipment, other than a person may be generation-target objects of a 3D model. In the present specification, explanation is given on the assumption that an "image" is not limited to a still image and an image that is captured or reproduced across continuous times (that is, moving image including a plurality of continuous frames) is also included.

<System Configuration>

Figure 1:
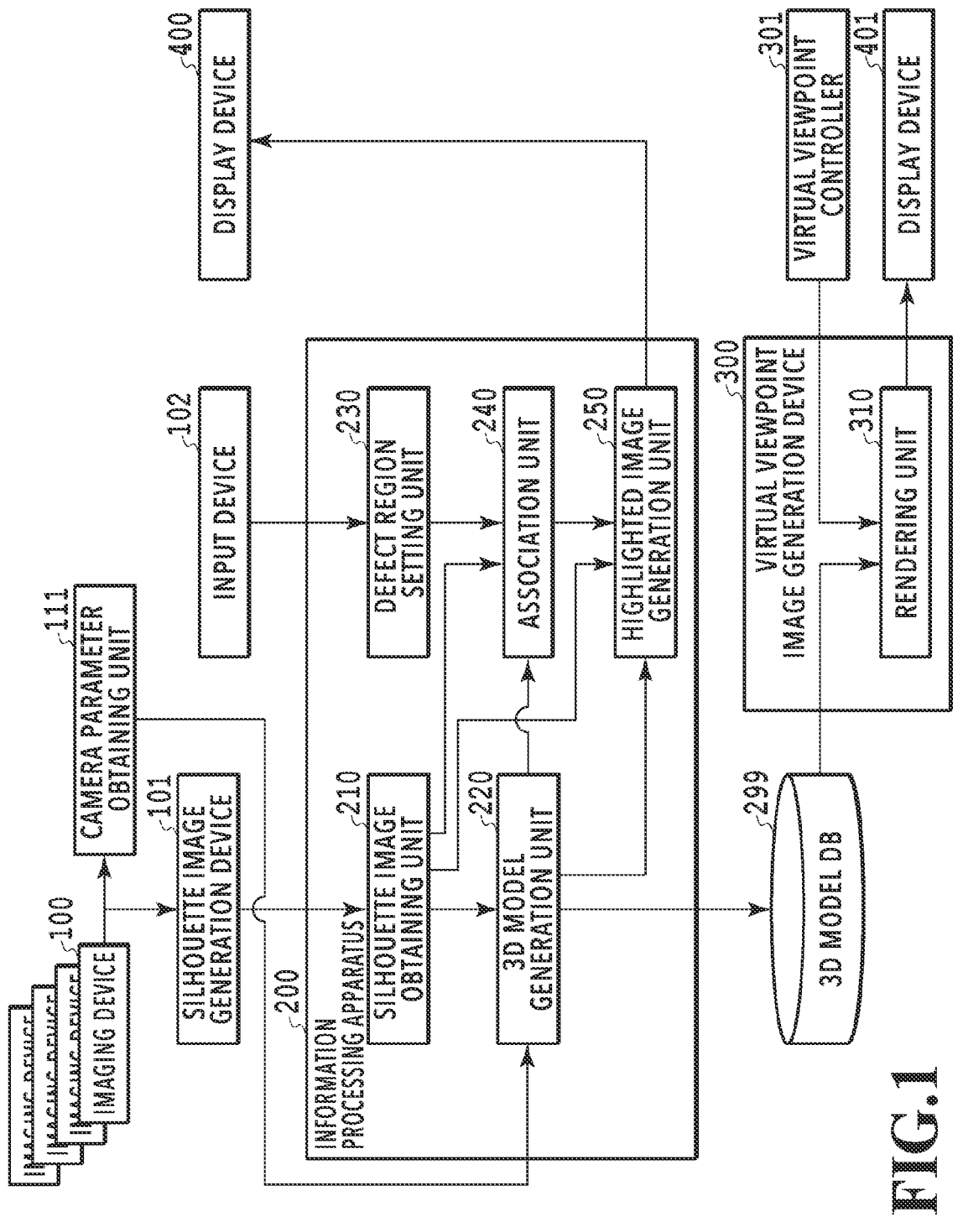
FIG. 1 is a diagram showing a configuration example of an image processing system.

FIG. 1 is a diagram showing a configuration example of an image processing system according to the present embodiment, which generates, from a plurality of images captured by a plurality of imaging devices, a 3D model of an object captured therein and generates a virtual viewpoint image based on the 3D model. In the following, with reference to FIG. 1, each device configuring the image processing system according to the present embodiment is explained.

Each of a plurality of installed imaging devices 100 captures an image capturing area from a direction different from one another. The imaging area is, for example, an outdoor stadium, an indoor image capturing studio, a stage on which a theatrical performance is played, and the like. Each imaging device 100 is installed at a position different from one another so as to surround an imaging area and performs image capturing in synchronization. The plurality of imaging devices 100 may not be installed along the entire circumference of the image capturing area, but may be installed only in a partial direction of the image capturing area depending on the limitations on the installation position. Further, the number of imaging devices is not limited particularly and for example, in a case where the image capturing area is a soccer or baseball stadium, it may also be possible to install about 100 imaging devices around the field in which a game is played. Further, the imaging devices whose functions are different may be installed in such a manner that the imaging devices functioning as a telescope camera and the imaging devices functioning as a wide-angle camera are arranged in a mixed manner.

A camera parameter obtaining unit 111 obtains and stores, as imaging device information, a set of parameters, such as a three-dimensional position, pan, tilt, and roll directions, the size of a field of view (viewing angle), and resolution, for each of the plurality of imaging devices 100. As the imaging device information, it may be possible to obtain, for example, what is calculated by performing so-called camera calibration in advance in another device, not shown schematically. In a case where the plurality of imaging devices 100 captures a moving image, the imaging device information may have a parameter set corresponding to each of a plurality of frames. That is, the imaging device information may be information indicating the position and direction of the imaging device at each point in time of the continuous times.

A silhouette image generation device 101 generates a silhouette image representing a silhouette of an object (person), such as a stage performer, by a binary value of white and black based on a plurality of images obtained by the plurality of imaging devices 100 performing synchronous image capturing. In a case where the plurality of images is moving images, the silhouette image is also generated for each frame. The plurality of silhouette images generated by the silhouette image generation device 101 is associated with information (time code) indicating the image capturing time and sent to an information processing apparatus 200.

An input device 102 is, for example, a device such as a mouse, for giving instructions of a user. A user designates, for example, a defect region of a 3D model, by operating a mouse or the like via a UI screen that is displayed on a display device 400. In a case where the display device 400 is a liquid crystal display or the like having a touch panel function, the display device 400 also comprises the function as the input device 102. User instructions via the input device 102 are sent to the information processing apparatus 200.

The information processing apparatus 200 has a silhouette image obtaining unit 210, a 3D model generation unit 220, a defect region setting unit 230, an association unit 240, and a highlighted image generation unit 250. The silhouette image obtaining unit 210 obtains a plurality of silhouette images transmitted from the silhouette image generation device 101. The 3D model generation unit 220 generates a 3D model of an object by, for example, the visual hull method, by using a plurality of silhouette images and imaging device information. The generated 3D model is sent to and stored in a 3D model DB 299. The defect region setting unit 230 sets a three-dimensional marker identifying a hole or chip (defect region) having occurred in the generated 3D model. The set three-dimensional marker is sent to the association unit 240 as defect region information. The association unit 240 performs processing to associate each of the plurality of silhouette images and the three-dimensional marker with each other. Results of the association processing are sent to the highlighted image generation unit 250. The highlighted image generation unit 250 generates an image (in the following, called "highlighted image") in which the area representing the defect region in each silhouette image is highlighted based on the results of the association processing. The generated highlighted image is sent to the display device 400. The display device 400 is, for example, a liquid crystal display and displays the highlighted image received from the information processing apparatus 200.

A virtual viewpoint image generation device 300 has a rendering unit 310. The rendering unit 310 generates a virtual viewpoint image representing an appearance from a virtual imaging device not actually existing in the imaging area by using virtual viewpoint information that is input from a virtual viewpoint controller 301. The generated virtual viewpoint image is sent to a display device 401. The virtual viewpoint controller 301 is, for example, a game controller, such as a joy stick, and generates virtual viewpoint information by manipulating a virtual camera on a UI screen on which, for example, an image capturing area is reconfigured by CG. The virtual viewpoint information is information on the three-dimensional position, direction, viewing angle, and resolution of the virtual camera virtually existing at the virtual viewpoint, which is formed in the same format as that of the imaging device information by a user input. The virtual viewpoint information is transmitted to the virtual viewpoint controller 301 and the rendering unit 310. The display device 401 is, for example, a liquid crystal display and displays the virtual viewpoint image received from the virtual viewpoint image generation device 300. It may also be possible to use the display device 400 as the display device 401 and vice versa. Further, as the display device 401 and the display device 400, it may also be possible to use a projector and a head mount display, not limited to the liquid crystal display.

<Hardware Configuration of Information Processing Apparatus>

Figure 2:
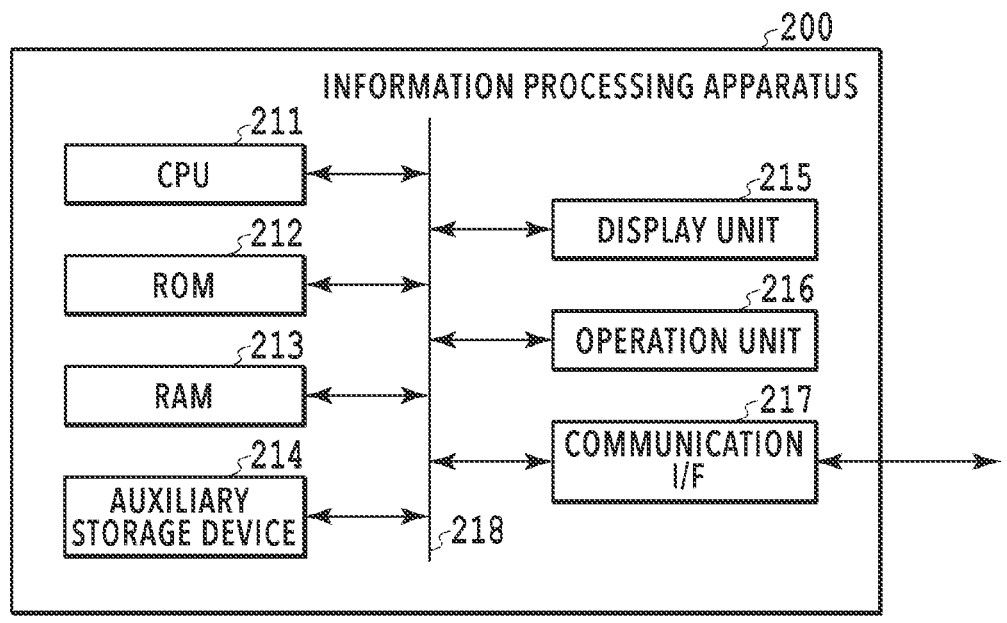
FIG. 2 is a diagram showing one example of a hardware configuration of an information processing apparatus.

FIG. 2 is a diagram showing one example of the hardware configuration of the information processing apparatus 200. The hardware configuration of the silhouette image generation device 101 and the virtual viewpoint image generation device 300 is also the same as the hardware configuration of the information processing apparatus 200 shown in FIG. 2.

The information processing apparatus 200 has a CPU 211, a ROM 212, a RAM 213, an auxiliary storage device 214, a display unit 215, an operation unit 216, a communication I/F 217, and a bus 218. The CPU 211 implements each function of the information processing apparatus 200 by controlling the whole of the information processing apparatus 200 by using computer programs and data stored in the ROM 212 and the RAM 213. The information processing apparatus 200 may have a piece or a plurality of pieces of dedicated hardware different from the CPU 211 and at least part of the processing that is performed by the CPU 211 may be performed by the dedicated hardware. As examples of the dedicated hardware, there are an ASIC (Application Specific Integrated Circuit), FPGA (Field Programmable Gate Array), DSP (Digital Signal Processor) and the like. The ROM 212 stores programs and the like that do not need to be changed. The RAM 213 temporarily stores programs and data supplied from the auxiliary storage device 214, data supplied from the outside via the communication I/F 217, and the like. The auxiliary storage device 214 includes, for example, a hard disk drive and the like and stores various types of data, such as image data and voice data. For example, the 3D model DB 299 described previously is implemented by the auxiliary storage device 214. The display unit 215 includes, for example, a liquid crystal display, LED or the like and displays a GUI (Graphical User Interface) for a user to operate the information processing apparatus 200, and the like. The operation unit 216 includes, for example, a keyboard, mouse, joystick, touch panel, game controller and the like and receives operations by a user and inputs various instructions to the CPU 211. It may also be possible to implement the input device 102 described previously by the operation unit 216. The CPU 211 operates as a display control unit configured to control the display unit 215 and an operation control unit configured to control the operation unit 216. The communication I/F 217 is used for communication with an external device of the information processing apparatus 200. For example, in a case where the information processing apparatus 200 is connected with an external device via a wire, a communication cable is connected to the communication I/F 217. In a case where the information processing apparatus 200 has the function to wirelessly communicate with an external device, the communication I/F 217 comprises an antenna. The bus 218 connects each unit of the information processing apparatus 200 and transmits information. In the present embodiment, the display unit 215 and the operation unit 216 exist inside the information processing apparatus 200, but it may also be possible for at least one of the display unit 215 and the operation unit 216 to exist as another device outside the information processing apparatus 200.

<Processing Flow of Information Processing Apparatus>

Figure 3:
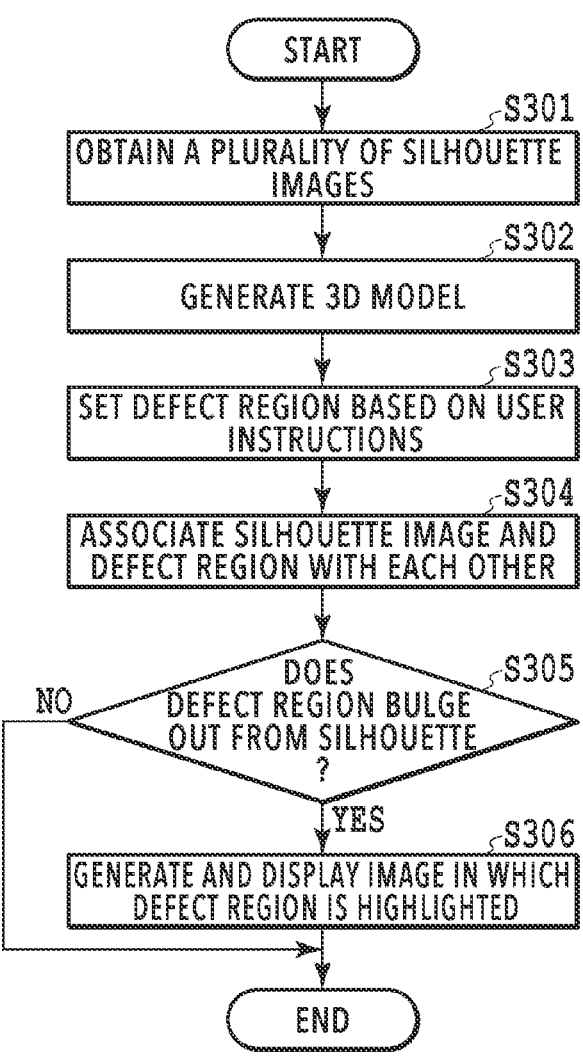
FIG. 3 is a flowchart showing a flow of processing in an information processing apparatus according to a first embodiment.

Next, a flow of processing in the information processing apparatus 200 according to the present embodiment is explained by using the flowchart in FIG. 3. The series of processing shown in the flowchart in FIG. 3 is implemented by the CPU 211 reading a program stored in the ROM 212 or the auxiliary storage device 214 and loading the program onto the RAM 213 and executing the program. In the following explanation, a symbol "S" means a step.

At S301, the silhouette image obtaining unit 210 receives and obtains a plurality of silhouette images sent from the silhouette image generation device 101. The silhouette image is an image representing the luminance value of the pixel on a captured image by two values, that is, the luminance of the pixel configuring the area (object area) in which, for example, a person is captured by "255", and the luminance value of the pixel of the area (non-object area) other than the object area by "0". The silhouette image only needs to be capable of distinguishing the pixel of the object area from the pixel of the non-object area and is not limited to the above-described binary image. Further, the silhouette image obtaining unit 210 separately stores the pixel values (RGB values) of the object area within the captured image as color information used for coloring (color determination) of a 3D model to be generated at next S302.

At S302, the 3D model generation unit 220 generates data (3D model) representing the three-dimensional shape of the object by using the plurality of silhouette images obtained at S301. For this generation, for example, the visual hull method (Visual-Hull) is used. In the visual hull method, whether a voxel within a three-dimensional space is included in all of the plurality of silhouette images is determined and the voxel estimated to be outside the object is deleted and the set of the remaining voxels is handled as what represents the three-dimensional shape of the object. The generated 3D model is sent to and stored in the 3D model DB 299.

Figure 4A:
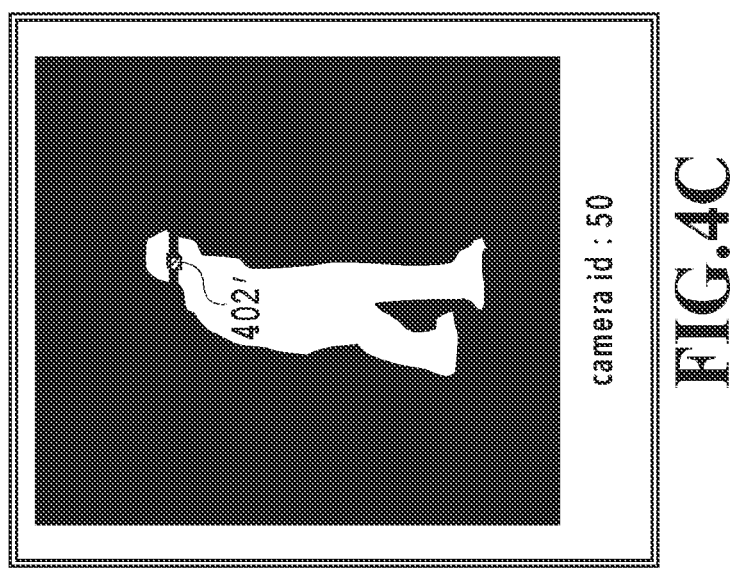
FIG. 4A is a diagram showing one example of a UI screen.
Figure 4B:
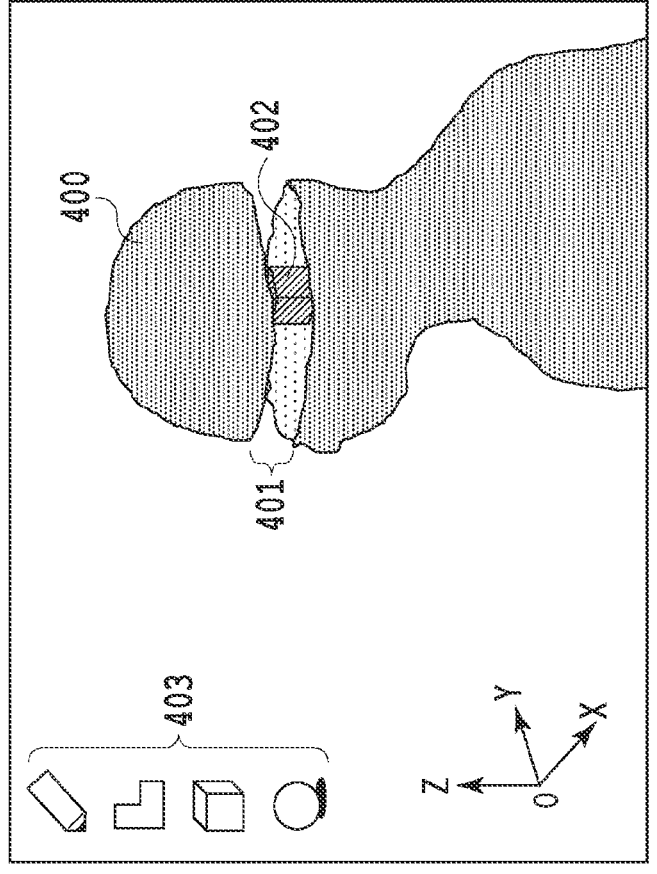
FIG. 4B is a diagram showing one example of a silhouette image list.

At S303, the defect region setting unit 230 sets defect region information identifying the defect region in the 3D model generated at S302. FIG. 4A is a diagram showing one example of a UI screen used in a case where a user designates the defect region by using the input device 102, checks the area of the defect region in each silhouette image, and so on. On the UI screen an area in which a generated 3D model is displayed and an area in which various UI elements are displayed exist. A user sets, to a displayed 3D model 400, a three-dimensional marker 402 indicating the position of a defect region 401 having occurred in the 3D model by using a mouse or the like, which is the input device 102. Here, the defect region 401 occurs as a result of that a chip occurs in the silhouette representing the person in one of the silhouette images included in a silhouette image list shown in FIG. 4B and voxels are deleted by the visual hull method. In order to find the imperfect silhouette image having caused the defect region 401 from the silhouette image list in FIG. 4B, the user designates and inputs at least part of the defect region 401 with a mouse or the like. In this case, it is possible for the user to find the defect region 401 by moving the viewpoint, rotating the 3D model 400, enlarging the display, and so on, by using a mouse or the like on the UI screen in FIG. 4A. Then, the user sets the three-dimensional marker 402 in order to identify the position of the found defect region 401. The set three-dimensional marker 402 is used for the detection of the defect region in the silhouette image as will be described later, and therefore, it is necessary for the three-dimensional marker 402 to correspond to at least part of the defect region 401 in the 3D model 400. The operation to set the three-dimensional marker 402 is performed, for example, on the UI screen in FIG. 4A, by using tool icons 403, which are UI elements arranged one on top of another at the leftmost end on the screen. It is possible for the user to set the three-dimensional marker 402 to any position on the 3D model by selecting an arbitrary icon (here, rectangular parallelepiped icon) from among the tool icons 403 and clicking and dragging with a mouse. Here, the data format of the three-dimensional marker 402 is, for example, in a case of the rectangular parallelepiped icon, a polygon mesh having information on eight vertices and six planes. The data format may be information on a set of three-dimensional coordinates of voxels configuring the rectangular parallelepiped in place of the polygon mesh. Alternatively, the data format may be information on the center of gravity of the rectangular parallelepiped and the length in the direction of each axis. The shape of the three-dimensional marker is not limited and it is possible to adopt various shapes, such as a sphere, in addition to the rectangular parallelepiped. The information relating to the three-dimensional marker 402 thus set is associated with the 3D model and sent to the association unit 240 as defect region information.

At S304, the association unit 240 associates the defect region identified by the defect region information set at S303 and each silhouette image from which the 3D model generated at S302 is generated with each other. In a case of the present embodiment, this association is implemented by projecting the three-dimensional marker onto each silhouette image. Here, with a position X of the three-dimensional marker being represented by three-dimensional coordinates (x, y, z), two-dimensional coordinates xi=(xc, yc) on the image in a case where the position X is projected onto the image captured by an actual camera by a pinhole camera model is expressed by formula (1) below in homogeneous coordinate system representation.

$$\begin{bmatrix} x_i \\ 1 \end{bmatrix} \propto P \begin{bmatrix} X \\ 1 \end{bmatrix} \qquad \text{formula (1)}$$

In formula (1) described above, P is a 4×3 matrix retained as a parameter set of each imaging device 100 and ∝ indicates that the vectors on both sides are equal except for length. By the coordinate system conversion such as this, an image (in the following, called "association image") representing the results of projecting the three-dimensional marker indicating the position of the defect region onto each silhouette image is obtained. The association image of each silhouette image thus obtained is sent to the highlighted image generation unit 250.

At S305, the highlighted image generation unit 250 determines whether at least part of the three-dimensional marker projected onto each silhouette image bulges out from the object area in each silhouette image based on the association image generated at S304. It is possible to regard this determination as processing to search for an image in which a portion that should originally be formed as an object area has become a non-object area due to some factor and a defect has occurred in the silhouette from among many silhouette images. In a case where there is an association image for which it is determined that at least part of the set three-dimensional marker bulges out from the object area, S306 is performed following this, and in a case where there is not such an association image, this processing is terminated.

Figure 4C:
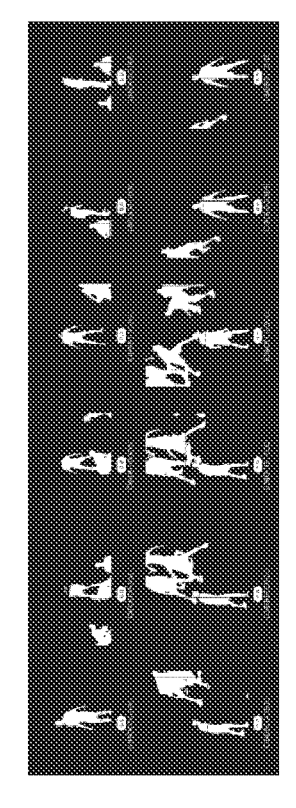
FIG. 4C is a diagram showing one example of a highlighted image.

At S306, the highlighted image generation unit 250 generates an image in which the portion of the three-dimensional marker is highlighted (in the following, called "highlighted image") for the association image for which it is determined that at least part of the three-dimensional marker bulges out from the object area at S305. Specifically, the highlighted image generation unit 250 generates an image in which the area of the three-dimensional marker (≈defect area) in the processing-target association image is drawn by a fluorescent color, for example, such as magenta. The generated highlighted image is output to and displayed on the display device 400. At this time, in a case where a plurality of highlighted images is generated, at least one is displayed selectively in accordance with, for example, the ratio of the defect region highlighted in each highlighted image to the whole. FIG. 4C is a diagram showing one example of a highlighted image. In the highlighted image shown in FIG. 4C, an area 402' of the three-dimensional marker projected onto the silhouette image is highlighted. Due to the highlighted image such as this generated for each silhouette image, it is possible for a user to easily find the silhouette image causing the defect region having occurred in the 3D model and the imaging device corresponding to the silhouette image. It may also be possible to display the UI screen, the silhouette image list, and the highlighted image shown in FIG. 4A to FIG. 4C in a switching manner in accordance with a user operation of a switching button, not shown schematically, or the like, or display them at the same time by arranging side by side within one screen.

The above is the flow of the processing in the information processing apparatus 200 according to the present embodiment. In a case where the three-dimensional marker according to the user instructions indicates a position at which no object exists (space in which nothing exists) because of the erroneous operation of a user or the like, at S305, it is determined erroneously that the three-dimensional marker bulges out from the object area. In order to prevent the erroneous determination such as this, it may also be possible to find the shortest distance on the image from the three-dimensional marker to the object area for each association image and exclude the association image whose shortest distance is greater than a predetermined value from the determination processing target, or produce an error display. Further, in a case where it is determined that the three-dimensional marker does not bulge out from the object area in any association image at S305, it may also be possible to display the association image whose area of the three-dimensional marker on the image is the largest on the UI screen and prompt a user to check the image. Alternatively, it may also be possible to display a message indicating that a three-dimensional marker that bulges out from the object area is not detected.

As above, according to the present embodiment, it is possible to easily identify a silhouette image causing a hole or chip of the 3D model even from a large number of silhouette images corresponding to a large number of imaging devices, for example, such as 100 imaging devices. Further, it is also possible to perform control so that the identified silhouette image is excluded or modified and the generation of a 3D model is performed anew automatically (regeneration of 3D model). As a method of modifying the silhouette image, a method is considered in which the portion at which a hole or chip occurs on the highlighted image in FIG. 4C is filled in by operating a mouse utilizing, for example, the paint function, or the like. Further, it is also possible to perform automatic modification without the intervention of the hand of a user by setting the three-dimensional marker so as to fill in the whole defect region at S303 and at next S304, handling the area of the three-dimensional marker projected onto the silhouette image as the modified object area. It may also be possible to separately store the pixel values (RGB values) in the vicinity of the object area on the captured image, which is the source of the silhouette image. Due to this, it is possible to restore a natural color at the modified portion in coloring of the 3D model.

Second Embodiment

In the first embodiment, the configuration is such that a user checks the generated 3D model on the UI screen and designates the defect region, such as a hole and a chip. Next, a configuration is explained as a second embodiment, in which based on a 3D model stored in the apparatus in advance, (in the following, also described as prepared data), the defect region, such as a hole and a chip, having occurred in a 3D model is detected automatically. Explanation of the contents common to those of the first embodiment is omitted and in the following, different points are explained mainly.

Figure 5:
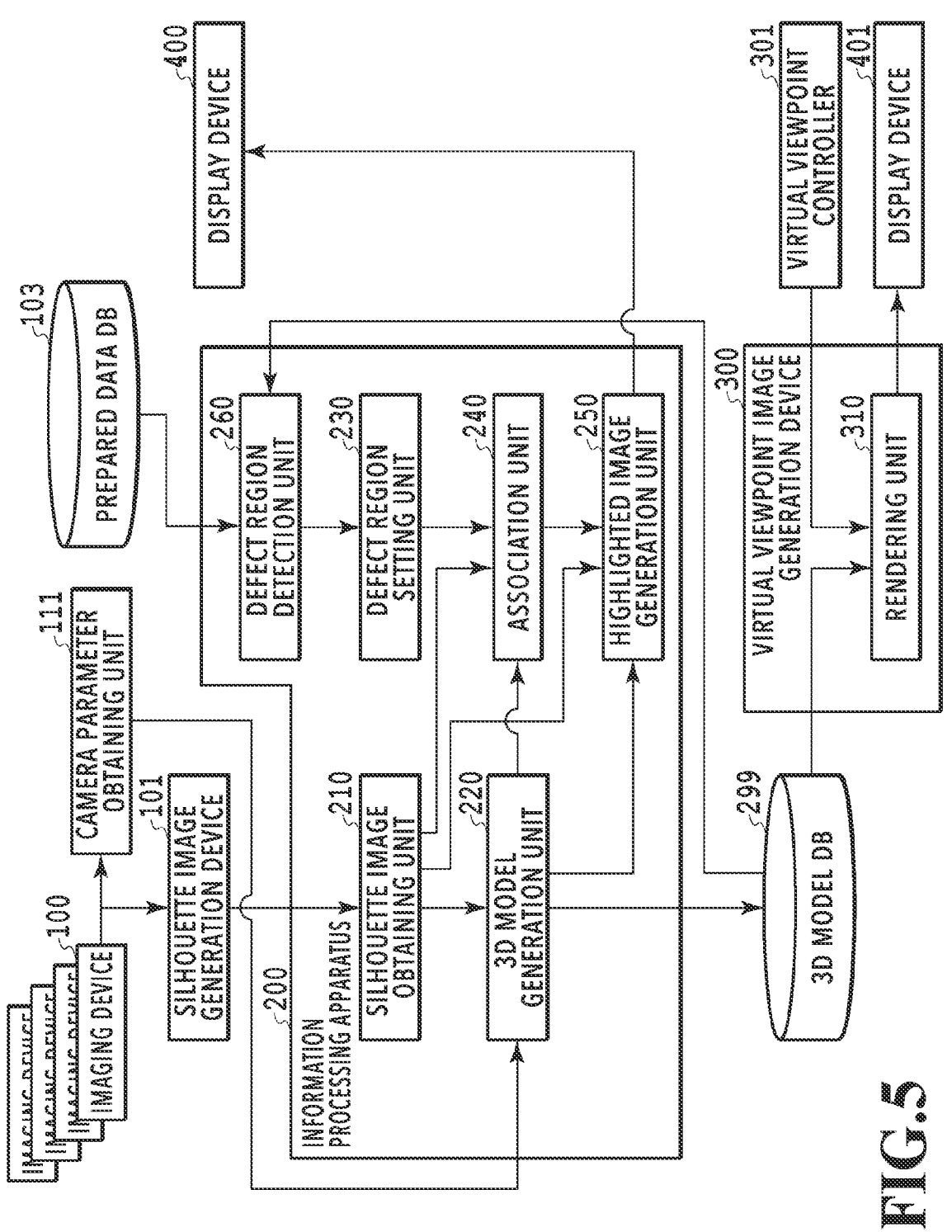
FIG. 5 is a diagram showing a configuration example of an image processing system according to a second embodiment.
Figure 6:
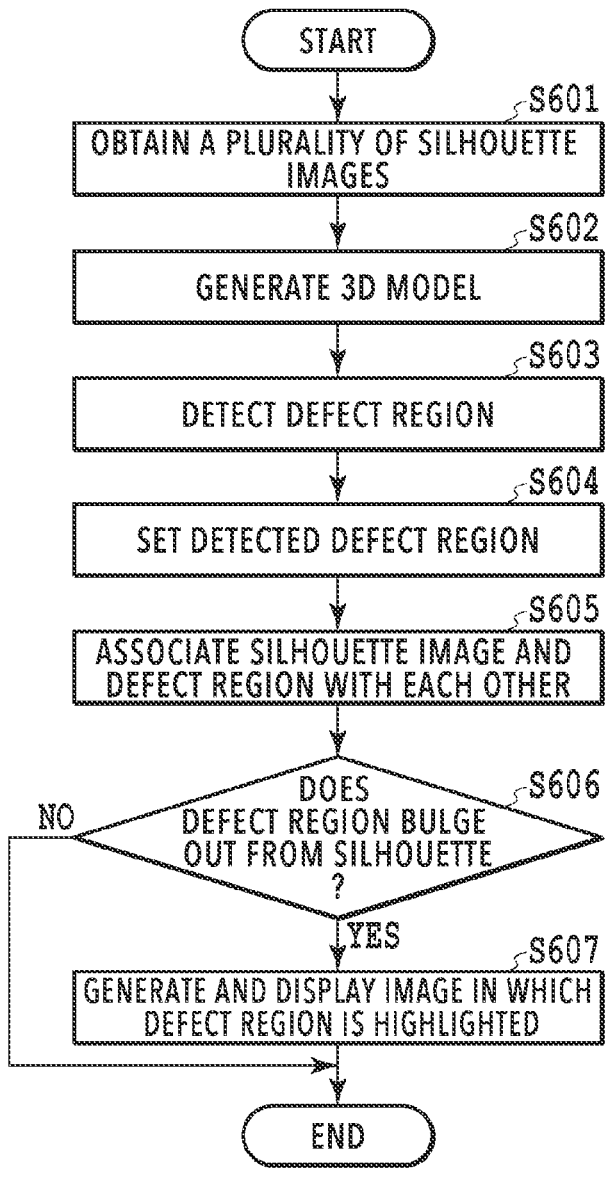
FIG. 6 is a flowchart showing a flow of processing in an information processing apparatus according to the second embodiment.

FIG. 5 is a diagram showing a configuration example of an image processing system according to the present embodiment and FIG. 6 is a flowchart showing a flow of processing in the information processing apparatus 200 according to the present embodiment. The large difference from the image processing system of the first embodiment is that a prepared data DB 103 and a defect region detection unit 260 are added. The prepared data (3D model) described previously is stored in the prepared data DB 103. In the following, with reference to the system configuration diagram in FIG. 5, the operation of the information processing apparatus 200 according to the present embodiment is explained along the flowchart in FIG. 6. In the following explanation, a symbol "S" means a step.

S601 and S602 are the same as S301 and S302 in the flowchart in FIG. 3 of the first embodiment. That is, first, at S601, the silhouette image obtaining unit 210 obtains a plurality of silhouette images sent from the silhouette image generation device 101. Next, at S602, the 3D model generation unit 220 generates a 3D model representing the three-dimensional shape of an object by using the obtained plurality of silhouette images.

At S603, the defect region detection unit 260 reads the 3D model generated at S602 from the 3D model DB 299. Further, the defect region detection unit 260 reads the prepared data relating to the 3D model from the prepared data DB 103 and detects the defect region of the 3D model based on the prepared data. Here, the prepared data is, for example, a 3D model representing the basic shape of an object and having no defect, and for example, in a case where the object is a person, the prepared data is a model with bones representing the shape of atypical person. Here, it may also be possible to prepare a plurality of types of model with bones of a person in according to the sex, height, physique and the like of a person object, which may be taken as a processing target. It may also be possible to create a model with bones by, for example, scanning the shape of the whole body of an actually existing person by using a laser scanner, or create on a computer by supposing a virtual person using 3D modeling software. In the following, the 3D model with no defect, which is created in advance and stored in the prepared data DB 103, is called "basic 3D model". The defect region detection unit 260 performs processing to fit the basic 3D model as the prepared data read from the prepared data DB 103 to the 3D model generated at S602. This fitting processing is processing to repeatedly deform bones so that the distance between the most neighboring points becomes shorter by using, for example, the ICP (Iterative Closest Points) algorithm. Then, the inside of the fit basic 3D model and the inside of the 3D model generated at S602 are compared and the three-dimensional area included within the basic 3D model but not included within the 3D model generated at S602 is detected as the defect region. At this time, it may also be possible not to detect the area within a predetermined range from the surface of the basic 3D model as the defect region by taking into consideration the error of the surface shape. Further, detection is not limited to the above-described fitting using the basic 3D model. For example, although the detection accuracy is reduced somewhat, it may also be possible to detect the defect region by using one or a plurality of pieces of two-dimensional shape data representing the basic shape of the object in a case of being viewed from a specific viewpoint as the prepared data. Further, it may also be possible to detect the defect region by using, for example, a trained model as the prepared data, which is obtained by performing machine learning using a large number of 3D models in which a hole or chip has occurred as training data. As above, the prepared data about the object in the present embodiment may be any data that is taken to be a reference of an object. Information on the three-dimensional area satisfying the condition that "inside the basic 3D model and outside the generated 3D model" thus detected is associated with the 3D model generated at S602 and sent to the defect region setting unit 230 within the information processing apparatus 200 as defect region information.

S604 corresponds to S303 in the flowchart in FIG. 3 of the first embodiment. Specifically, the defect region setting unit 230 sets defect region information identifying the defect region in the 3D model generated at S602 based on the three-dimensional area information received from the defect region detection unit 260.

Each step at S605 to S607 that follow corresponds to each of S304 to S306 in the flowchart in FIG. 3 of the first embodiment. That is, first, the association unit 240 associates the three-dimensional area identified by the defect region information set at S604 and each silhouette image of the source of generation of the 3D model generated at S603 with each other (S605). Next, the highlighted image generation unit 250 determines whether at least part of the three-dimensional area projected onto each silhouette image bulges out from the object area in each silhouette image based on the association image generated at S605 (S606). Then, in a case where it is determined that at least part bulges out, the highlighted image generation unit 250 generates a highlighted image in which the portion of the projected three-dimensional area is highlighted for the association image for which it is determined that at least part bulges out (S607).

The above is the flow of the processing in the information processing apparatus 200 according to the present embodiment. In this manner, according to the present embodiment, it is possible for a user to easily identify a silhouette image causing a hole or chip from among a large number of silhouette images corresponding to a large number of imaging devices without the need for a user him/herself to take time and effort to designate the defect region. Further, it is possible to automatically modify the identified silhouette image based on the association image generated at S605 by regarding the portion of the three-dimensional area projected onto each silhouette image as the object area.

Modification Example

In the first and second embodiments, the configuration is explained in which based on information on the defect region having occurred in the 3D model corresponding to a specific time (specific frame) during the image capturing period, the silhouette image at the same time, which has caused the defect, is identified and the image in which the defect is highlighted is presented to a user. Next, a method is explained as a modification example of the first and second embodiments, in which the defect regions at times before and after the specific time (frames before and after specific frame) are detected automatically and highlighted images are presented across a plurality of times including the specific time. In the following explanation, only the points different from those in the flowcharts in FIG. 3 and FIG. 6 described previously are explained.

In the present modification example, after the processing at S306 or S607 is completed, the defect region setting unit 230 causes the three-dimensional marker or the three-dimensional area set at S303 or S604 to be developed in the silhouette images at the times before and after the time at which the three-dimensional marker or the three-dimensional area is set. At this time, in a case where there is no movement of the object between the times (between frames), the position coordinates of the three-dimensional marker or the three-dimensional area in the silhouette images after the development remain the same. In a case where there is a two-dimensional or three-dimensional movement of the object between the times, it is sufficient to move the position of the three-dimensional marker or the three-dimensional area in the silhouette images after the development in accordance with the movement. Specifically, position adjustment of the 3D model is performed between the time at which the defect region is identified and the times before and after the specific time by the method, such as the above-described ICP, and in accordance with the amount of movement of the 3D model, the position of the set three-dimensional marker or the three-dimensional area is moved.

In a case where the above-described development processing is completed, the processing returns to S304 or S605 and processing to associate the developed three-dimensional marker or the three-dimensional area with the silhouette image corresponding to each of the times before and after the specific time is performed. At this time, it is sufficient to store the silhouette images at the times before and after the specific time in the 3D model DB 299 together in a case where the 3D model is generated and stored (S302 or S602) and use them for reading.

Figures 7A, 7B:
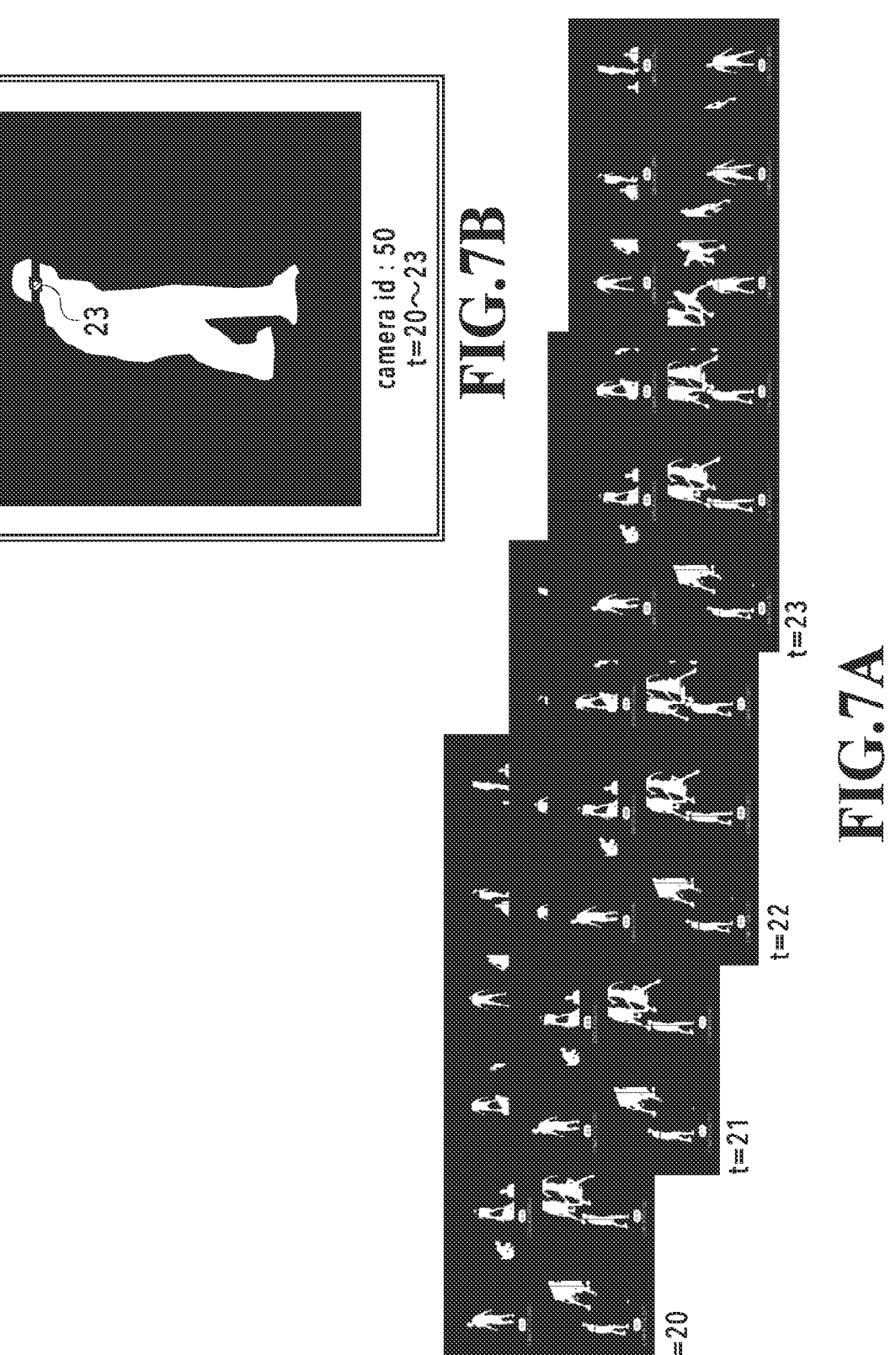
FIG. 7A is a diagram showing one example of silhouette images corresponding to a plurality of continuous times after development processing and FIG. 7B is a diagram showing one example of a highlighted image according to a modification example.

In a case where the association after the development is completed, the processing advances to S305 or S606. Then, based on the association images at the times before and after the time at which the three-dimensional marker or the three-dimensional area is developed, whether at least part of the projected three-dimensional marker or the three-dimensional area bulges out from the object area in each silhouette image is determined. Then, in a case where it is determined that at least part bulges out, the processing advances to S306 or S607 and a highlighted image in which the portion of the projected three-dimensional area is highlighted is generated for the association image for which it is determined that at least part bulges out. FIG. 7A is one example of silhouette images corresponding to a plurality of continuous times after the development processing. Further, FIG. 7B is a diagram showing one example of a highlighted image according to the present modification example and as shown in FIG. 7B, in the present modification example, it may also be possible to display time information together. It may also be possible to perform development in a certain period of time in between, such as at predetermined time intervals, not limited to the times immediately before and after the specific time. Further, in the example described above, after the development processing, the processing returns to S304 or S605, but this is not limited. For example, it may also be possible to perform position adjustment of the silhouette between the time at which the defect region is identified and the times before and after the specific time by a method, such as an optical flow, and move the position of the projected defect area in accordance with the amount of movement of the silhouette on the silhouette image. In this case, after the development processing, the processing returns to S305 or S606 and the processing to determine whether or not at least part bulges out is performed. As above, according to the present modification example, each piece of processing of the development in the times before and after the specific time being sandwiched in between, association, generation and presentation of a highlighted image is repeated until the chip of the silhouette image is no longer detected. Due to this, it is possible for a user to easily grasp a hole or a chip in the silhouette images across a plurality of times configuring a certain section within the image capturing period.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to easily identify a silhouette image causing a hole or chip having occurred in a 3D model and the imaging device corresponding to the silhouette image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-001900, filed Jan. 10, 2023 which is hereby incorporated by reference wherein in its entirety.

What is claimed is:

1. An information processing apparatus comprising:
one or more memories storing instructions; and
one or more processors executing the instructions to perform:
obtaining a plurality of silhouette images representing a silhouette of an object, wherein the plurality of silhouette images are captured by a plurality of imaging devices;
generating a 3D model representing a three-dimensional shape of the object based on the plurality of silhouette images;
setting defect region information identifying a defect region of the generated 3D model, the defect region corresponding to a missing portion of the three-dimensional shape of the object caused by a missing silhouette portion in at least one of the plurality of silhouette images;
associating the defect region identified by the set defect region information with the plurality of silhouette images; and
generating and displaying a highlighted image in which the defect region identified by the associated defect region information is highlighted for a silhouette image in which the defect region is included in a silhouette of the object among the plurality of silhouette images and in which the highlighted image indicates a region corresponding to the missing silhouette portion in the silhouette image.

2. The information processing apparatus according to claim 1, wherein the one or more processors further execute the instructions to perform:

displaying a first UI screen for receiving user instructions to designate a defect region having occurred in the generated 3D model and the defect region information is set based on the user instructions via the first UI screen.

3. The information processing apparatus according to claim 2, wherein on the first UI screen, a UI element for a user to designate the generated 3D model and the defect region having occurred in the 3D model is displayed and the user instructions are given by using the UI element.

4. The information processing apparatus according to claim 3, wherein the UI element is a three-dimensional marker.

5. The information processing apparatus according to claim 1, wherein the one or more processors further execute the instructions to perform:

detecting the defect region having occurred in the generated 3D model based on data relating to the object, which is stored in advance in a storage unit and the defect region information is set based on results of the detection.

6. The information processing apparatus according to claim 5, wherein the data relating to the object is a basic 3D model having no defect of the object and the defect region having occurred in the 3D model is detected by performing processing to fit the basic 3D model to the generated 3D model.

7. The information processing apparatus according to claim 6, wherein the object is a person and the 3D model having no defect is a 3D model with bones.

8. The information processing apparatus according to claim 5, wherein the data relating to the object is one or a plurality of pieces of two-dimensional shape data representing a basic shape of the object when being viewed from a specific viewpoint.

9. The information processing apparatus according to claim 1, wherein the one or more processors further execute the instructions to perform:

displaying at least one highlighted image selectively in accordance with a ratio of an area occupied by a defect region highlighted in each highlighted image when a plurality of highlighted images is generated.

10. The information processing apparatus according to claim 1, wherein the one or more processors further execute the instructions to perform:

modifying a silhouette image in which a defect region identified by the associated defect region information is included in a silhouette of the object so that the defect region is filled in the silhouette of the object indicated by the silhouette image.

11. The information processing apparatus according to claim 10, wherein the one or more processors further execute the instructions to perform:

displaying a second UI screen for receiving user instructions to designate a portion to be modified and the modifying is performed based on the user instructions via the second UI screen.

12. The information processing apparatus according to claim 10, wherein the modifying is performed automatically based on results of the association.

13. The information processing apparatus according to claim 10, wherein the one or more processors further execute the instructions to perform:

regenerating the 3D model of the object by using the modified silhouette image.

14. The information processing apparatus according to claim 1, wherein if the obtained plurality of silhouette images is moving images including a plurality of frames, the generating, the setting, the associating, and the displaying are performed for each frame.

15. The information processing apparatus according to claim 14, wherein defect region information identifying a defect region of the 3D model generated for a specific frame of the plurality of frames is set and in the associating, processing to develop the defect region information in the specific frame in frames before and after the specific frame is performed.

16. The information processing apparatus according to claim 1, wherein the one or more processors further execute the instructions to perform:

associating the defect region identified by the set defect region information with the plurality of silhouette images by projecting the defect region onto each of the plurality of silhouette images using imaging parameters of the plurality of imaging devices and determining, for each of the plurality of silhouette images, whether a projected region corresponding to the defect region protrudes from or is not included in a silhouette area in the silhouette image.

17. An information processing method comprising the steps of:

obtaining a plurality of silhouette images representing a silhouette of an object, wherein the plurality of silhouette images are captured by a plurality of imaging devices;

generating a 3D model representing a three-dimensional shape of the object based on the plurality of silhouette images;

setting defect region information identifying a defect region of the generated 3D model, the defect region corresponding to a missing portion of the three-dimensional shape of the object caused by a missing silhouette portion in at least one of the plurality of silhouette images;

associating the defect region identified by the set defect region information with the plurality of silhouette images; and generating and displaying a highlighted image in which the defect region identified by the associated defect region information is highlighted for a silhouette image in which the defect region is included in a silhouette of the object among the plurality of silhouette images and in which the highlighted image indicates a region corresponding to the missing silhouette portion in the silhouette image.

18. A non-transitory computer readable storage medium storing a program for causing a computer to perform an information processing method comprising the steps of:

obtaining a plurality of silhouette images representing a silhouette of an object, wherein the plurality of silhouette images are captured by a plurality of imaging devices;

generating a 3D model representing a three-dimensional shape of the object based on the plurality of silhouette images;

setting defect region information identifying a defect region of the generated 3D model, the defect region corresponding to a missing portion of the three-dimensional shape of the object caused by a missing silhouette portion in at least one of the plurality of silhouette images;

associating the defect region identified by the set defect region information with the plurality of silhouette images; and generating and displaying a highlighted image in which the defect region identified by the associated defect region information is highlighted for a silhouette image in which the defect region is included in a silhouette of the object among the plurality of silhouette images and in which the highlighted image indicates a region corresponding to the missing silhouette portion in the silhouette image.

* * * * *